(12) United States Patent
Luther et al.

(10) Patent No.: US 9,229,448 B1
(45) Date of Patent: Jan. 5, 2016

(54) ENERGY MANAGEMENT SYSTEM AND METHOD FOR VEHICLE SYSTEMS

(71) Applicant: GENERAL ELECTRIC COMPANY, Schenectady, NY (US)

(72) Inventors: Juli-Ann Luther, Lawrence Park, PA (US); Jeffrey Twichel, Erie, PA (US); Brian Nedward Meyer, Fairview, PA (US); Joseph Daniel Wakeman, Lawrence Park, PA (US); Swapna Rameshbabu Gaikwad, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/491,339

(22) Filed: Sep. 19, 2014

(51) Int. Cl.
*G05D 1/02* (2006.01)
*G05D 1/00* (2006.01)
*G01C 21/00* (2006.01)

(52) U.S. Cl.
CPC ...... *G05D 1/00* (2013.01); *G01C 21/00* (2013.01); *G05D 1/0005* (2013.01); *G05D 1/0011* (2013.01); *G05D 1/0016* (2013.01); *G05D 1/0027* (2013.01); *G05D 1/02* (2013.01); *G05D 1/0223* (2013.01)

(58) Field of Classification Search
CPC ..... G05D 1/00; G05D 1/0005; G05D 1/0011; G05D 1/0016; G05D 1/0027; G05D 1/0038; G05D 1/02; G05D 1/0214; G05D 1/0223; G05D 1/0268; G05D 1/0272; G05D 1/0287
USPC ............ 701/19, 20, 23–36, 93–98, 116, 121, 701/123, 400, 411, 416, 423, 300, 302
See application file for complete search history.

(56) References Cited

U.S. PATENT DOCUMENTS

| | | | |
|---|---|---|---|
| 6,691,957 B2 | 2/2004 | Hess, Jr. et al. | |
| 7,021,588 B2 | 4/2006 | Hess, Jr. et al. | |
| 7,974,774 B2 | 7/2011 | Kumar et al. | |
| 8,155,811 B2 | 4/2012 | Noffsinger et al. | |
| 8,234,023 B2 * | 7/2012 | Kumar | 701/20 |
| 8,249,763 B2 | 8/2012 | Brooks et al. | |
| 8,295,993 B2 | 10/2012 | Kumar | |
| 8,452,509 B2 * | 5/2013 | Sujan et al. | 701/70 |
| 8,473,127 B2 | 6/2013 | Daum et al. | |
| 8,571,723 B2 * | 10/2013 | Cooper et al. | 701/1 |
| 8,626,366 B2 * | 1/2014 | Noffsinger et al. | 701/21 |
| 8,645,047 B2 | 2/2014 | Daum et al. | |

(Continued)

OTHER PUBLICATIONS http://www.technologyreview.com/news/527476/10-4-good-computer-automated-system-lets-trucks-convoy-as-one; 5 pgs.

*Primary Examiner* — Thomas Tarcza
*Assistant Examiner* — Tyler J Lee
(74) *Attorney, Agent, or Firm* — GE Global Patent Operation; John A. Kramer (57) ABSTRACT

An energy management system and method for a vehicle system operate the vehicle system according to a current trip plan as the vehicle system travels along a route during a trip. The current trip plan designates operational settings of the vehicle system. The system and method also revise the current trip plan into a revised trip plan responsive to current, actual operation of the vehicle system differing from the current trip plan by at least a designated threshold amount. The revised trip plan designates operational settings of the vehicle system and includes an initial designated operational setting that matches the current, actual operation of the vehicle system.

15 Claims, 4 Drawing Sheets

(56) References Cited

U.S. PATENT DOCUMENTS

| | | |
|---|---|---|
| 8,751,073 B2 | 6/2014 | Kumar et al. |
| 2007/0219680 A1 | 9/2007 | Kumar et al. |
| 2007/0219682 A1 | 9/2007 | Kumar et al. |
| 2007/0225878 A1 | 9/2007 | Kumar et al. |
| 2009/0187291 A1 | 7/2009 | Daum et al. |
| 2010/0023190 A1 | 1/2010 | Kumar et al. |
| 2012/0277940 A1 | 11/2012 | Kumar et al. |
| 2012/0316717 A1* | 12/2012 | Daum et al. ............ 701/22 |
| 2013/0171590 A1* | 7/2013 | Kumar ............ 434/62 |
| 2013/0173083 A1* | 7/2013 | Cooper et al. ............ 701/1 |

* cited by examiner

ENERGY MANAGEMENT SYSTEM AND METHOD FOR VEHICLE SYSTEMS

FIELD

Embodiments of the subject matter disclosed herein relate to determining operational settings of vehicle systems for travel along one or more routes.

BACKGROUND

Some existing energy management systems can be used to control operations of vehicle systems during a trip to "optimize" performance of the vehicle systems. For example, Trip Optimizer™ provided by General Electric Company can be used to automatically control or direct an operator to control throttles of locomotives in a rail vehicle system to assist in keeping the rail vehicle systems on schedule while reducing fuel consumption and/or emission generation (relative to operating the locomotives without using Trip Optimizer™). These types of energy management systems can take into account factors such as length of the rail vehicle system, weight of the rail vehicle system, grade of the route being traveled upon, conditions of the route, weather conditions, and performance characteristics of the vehicles. The energy management systems create trip profiles or trip plans that reduce braking and can reduce the fuel consumed and/or emissions generated.

During travel according to a trip plan, various factors may cause the vehicle system to be unable to continue traveling according to the trip plan. For example, deteriorating health of a propulsion-generating vehicle in the vehicle system, damage to the vehicle system, damage to a route being traveled upon, adverse weather conditions, operator action (e.g., manual control) of the vehicle system, or the like, can cause the vehicle system to fall behind or otherwise be unable to follow the trip plan.

Some known systems and methods can "re-plan" the trip plan by revising the trip plan to account for the vehicle system falling behind the prior trip plan. But, these re-plans may generate a transitional plan that causes operations of the vehicle system to rapidly increase to return to operating according to the prior trip plan. Or, these re-plans can create new trip plans that begin with operational settings that are significantly different from the prior trip plan. As a result, the vehicle system may need to rapidly increase output in order to attempt to travel according to the revised trip plan. Either of these scenarios can cause the vehicle systems to significantly increase the amount of fuel consumed and/or emissions generated, in contradiction to the goals sought to be achieved by the trip plans.

BRIEF DESCRIPTION

In one embodiment, a method (e.g., for revising a trip plan of a vehicle system) includes operating a vehicle system according to a current trip plan as the vehicle system travels along a route during a trip. The current trip plan designates operational settings of the vehicle system. During movement of the vehicle system along the route, a current, actual operation of the vehicle system differs from the current trip plan by at least a designated threshold amount. The method also can include revising the current trip plan into a revised trip plan responsive to the current, actual operation of the vehicle system differing from the current trip plan by at least the designated threshold amount. The revised trip plan designates operational settings of the vehicle system and includes an initial designated operational setting that matches the current, actual operation of the vehicle system.

In another embodiment, a system (e.g., an energy management system) includes or more processors configured to at least one of direct an operator to control or autonomously control a vehicle system according to a current trip plan as the vehicle system travels along a route during a trip. The current trip plan designates operational settings of the vehicle system. During movement of the vehicle system along the route, a current, actual operation of the vehicle system differs from the current trip plan by at least a designated threshold amount. The one or more processors also are configured to revise the current trip plan into a revised trip plan responsive to the current, actual operation of the vehicle system differing from the current trip plan by at least the designated threshold amount. The revised trip plan designates operational settings of the vehicle system that include an initial designated operational setting that matches the current, actual operation of the vehicle system.

In another embodiment, a method (e.g., for revising a trip plan) includes operating a vehicle system according to a first trip plan that designates operational settings of the vehicle system as a function of one or more of time or distance along a route, determining an actual operational setting of the vehicle system, and, based at least in part on the actual operating setting, changing the operational settings designated by the first trip plan into revised operational settings of a revised trip plan. The revised trip plan includes a first operational setting of the revised operational settings that matches a current operational setting of the vehicle system during a time period that the revised trip plan is implemented in place of the first trip plan. The method also can include operating the vehicle system according to the operational settings designated by the revised trip plan.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

One or more embodiments of the systems and methods described herein provide trip plans for vehicle systems to travel along one or more routes during a trip. The trip plans designate operational settings of the vehicle systems during travel along the routes. These trip plans can designate speeds, accelerations, power outputs, brake settings, throttle positions, or the like, of the vehicle systems as a function of time and/or distance along the routes. In one aspect, the trip plans can designate the operational settings so that travel of a vehicle system according to the trip plan causes the vehicle system to consume less fuel and/or generate fewer emissions than the vehicle system traveling along the same route with different operational settings.

During travel according to the trip plan, the vehicle system may be unable to exactly follow the operational settings designated by the trip plan. For example, damage to a propulsion-generating vehicle of the vehicle system, damage to the route, adverse weather conditions, other vehicle systems impeding travel of the vehicle system, among other factors, can cause the vehicle system to not travel using the same operational settings of the trip plan. In response to the actual travel of the vehicle system deviating from the trip plan (e.g., such as where a difference between actual operating conditions of the vehicle system and the designated operational settings of the trip plan exceeds a designated, non-zero threshold), the trip plan may be revised by changing the operational settings designated by the trip plan for at least a portion of a remainder of the trip of the vehicle system. For example, the actual operating conditions can include the actual speeds, actual accelerations, actual throttle positions, actual brake settings or pressures, or the like, of the vehicle system. These conditions may be the same or within a designated threshold range of the operational settings designated by the trip plan when the vehicle system is able to follow the trip plan. But, the actual operating conditions may differ from the operational settings designated by the trip plan by more than the designated threshold range when the vehicle system is not able to follow the trip plan.

The revised trip plan may have designated operational settings that begin with a current, actual operational condition of the vehicle system. For example, the trip plan can be revised so that the operational setting that is designated by the trip plan to be implemented first by the vehicle system is the same as a current operational condition of the vehicle system. The revised trip plan may then be followed by the vehicle system, starting with the current operational condition of the vehicle system. As one example, if the trip plan designates a speed of ninety kilometers per hour for the vehicle system to travel at a particular location, but the vehicle system is only able to travel at seventy kilometers per hour at that location, then the trip plan can be revised with the revised trip plan beginning with a designated speed of seventy kilometers per hour.

Using the current operational condition of the vehicle setting as a starting operational setting for the revised trip plan instead of another operational setting can reduce fuel consumption and/or emission generation relative to revising the trip plan according to other known manners of revising trip plans. For example, some known systems and methods revise the trip plan in such a way as to return the vehicle system back to operating on the previously used trip plan. These systems and methods may generate a transitional plan that gets the operations of the vehicle system from a current state back to the trip plan or may generate a revised trip plan that does not start with the current operational conditions of the vehicle system. But, these transitional plans and revised trip plans may be mechanically impossible or improbable for the vehicle system, and/or may actually cause the vehicle system to rapidly increase operations to get back to the trip plan, and thereby consume more fuel and/or generate increased emissions relative to not following the trip plan.

Figure 1:
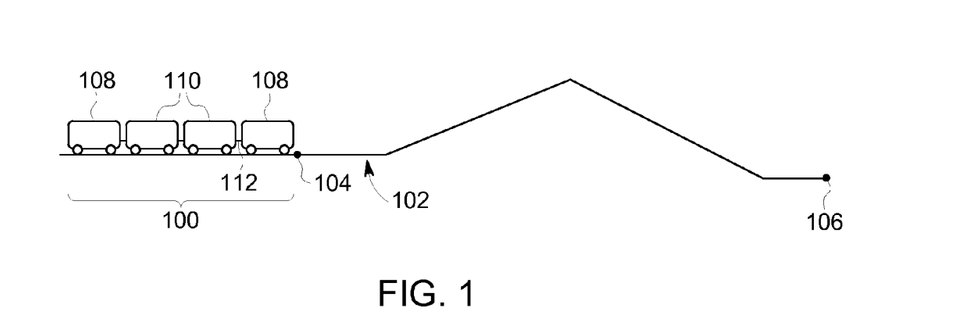
FIG. 1 schematically illustrates a trip of a vehicle system along a route according to one embodiment.

FIG. 1 schematically illustrates a trip of a vehicle system 100 along a route 102 according to one embodiment. The vehicle system 100 can travel from a first location 104 to a different, second location 106 along the route 102 according to a trip plan. The vehicle system 100 can include one or more propulsion-generating vehicles 108 and optionally may include one or more non-propulsion-generating vehicles 110. The vehicles 108, 110 may be mechanically coupled with each other, such as by couplers 112, such that the vehicles 108, 110 travel together. Optionally, the vehicle system 100 may include propulsion-generating vehicles 108 that are logically connected to each other without being mechanically coupled with each other. For example, the propulsion-generating vehicles 108 may communicate with each other to coordinate the movements of the vehicles 108 with each other such that the vehicles 108 travel together in a platoon.

The propulsion-generating vehicles 108 can represent one or more different vehicles that generate tractive effort or power to move the vehicle system 100 along the route 102. For example, the vehicles 108 can represent automobiles, locomotives, other off-highway vehicles (e.g., vehicles that are not designed and/or not permitted to travel on public roadways), marine vessels, aircraft, or the like. The non-propulsion-generating vehicles 110 can represent vehicles that do not generate tractive effort or power. For example, the vehicles 110 can represent railcars, trailers, barges, or the like.

The vehicle system 100 travels along the route 102 according to a trip plan. The trip plan can designate operational settings of the vehicle system 100 as a function of time and/or distance along the route 102. These operational settings can include speeds, accelerations, throttle positions, brake settings (e.g., brake pressures), or the like. Traveling according to the trip plan can cause the vehicle system 100 to reduce the amount of fuel consumed and/or emissions generated by the vehicle system 100 relative to the vehicle system 100 traveling according to other, different operational settings.

Figure 2:
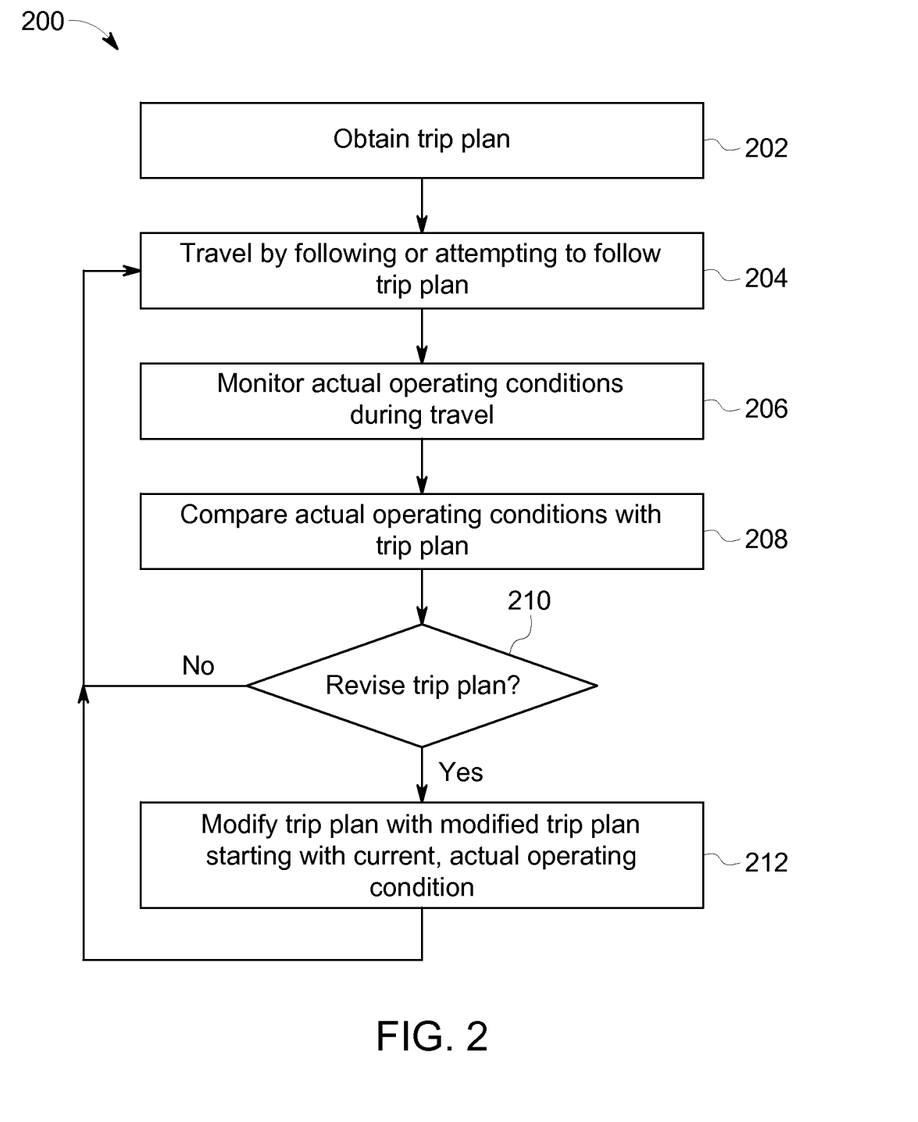
FIG. 2 illustrates a flowchart of a method for revising a trip plan of a vehicle system according to one embodiment.

FIG. 2 illustrates a flowchart of a method 200 for revising a trip plan of a vehicle system according to one embodiment. The method 200 may be practiced by an energy management system and/or controller disposed onboard the vehicle system 100 (shown in FIG. 1) and/or disposed off-board the vehicle system 100. At 202, a trip plan is obtained. The trip plan can be received from an off-board location, such as a dispatch facility, another vehicle system, an off-board operator control unit (e.g., a handheld remote control), or the like. Optionally, the trip plan may be created and/or obtained onboard the vehicle system 100. The trip plan may be created by an energy management system or obtained from a computer readable memory (e.g., a hard drive, flash drive, or the like) that stores previously created trip plans.

At 204, the vehicle system 100 travels along the route 102 (shown in FIG. 1) according to the trip plan. The vehicle system 100 may attempt to change the actual operational settings used by the vehicle system 100 to control movement of the vehicle system 100 so that actual operating conditions of the vehicle system 100 match the designated operational settings of the trip plan. For example, an operator of the vehicle system 100 may be informed of the operational settings designated by the trip plan as the vehicle system 100 travels along the route 102. The operator may then attempt to manually change the operational settings of the vehicle system 100 so that the actual operating conditions (e.g., the actual speed, actual acceleration, actual brake settings or pressures, etc.) of the vehicle system 100 follow the designated operational settings of the trip plan. Optionally, the vehicle system 100 may autonomously control the actual operating conditions of the vehicle system 100 according to the trip plan.

At 206, actual operating conditions of the vehicle system 100 are monitored as the vehicle system 100 travels along the route 102. For example, the speed at which the vehicle system 100 is actually moving may be measured by tachometers, global positioning system (GPS) circuitry, cellular communication circuitry, or the like, and/or may be determined based on data obtained from roadside transponders, rotation speeds of wheels, airspeed, or the like. As another example, the actual accelerations, actual power outputs, actual throttle positions, actual brake settings or pressures, or other conditions may be measured or determined during travel of the vehicle system 100.

At 208, the actual operating conditions of the vehicle system 100 are compared with the operational settings designated by the trip plan. The actual operating conditions can be compared with the designated operational settings to determine if differences exist. If the differences are sufficiently large, then the trip plan may need to be revised.

Figure 3:
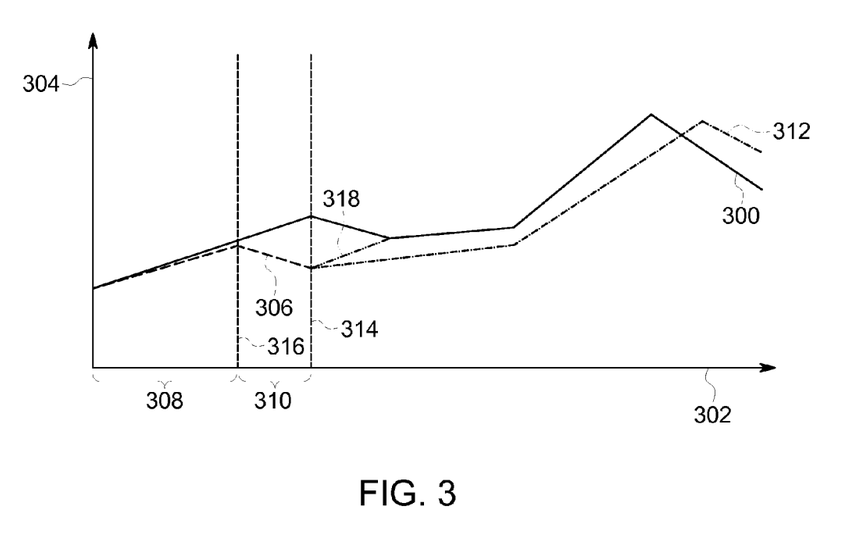
FIG. 3 illustrates operational settings designated by a trip plan for the vehicle system shown in FIG. 1 according to one example.

With continued reference to the method 200 shown in FIG. 2, FIG. 3 illustrates operational settings 300 designated by a trip plan for the vehicle system 100 (shown in FIG. 1) according to one example. The designated operational settings 300 are shown alongside a horizontal axis 302 representative of time elapsed during the trip and/or distance along the route 102 (shown in FIG. 1) during the trip. The designated operational settings 300 also are shown alongside a vertical axis 304 representative of different operational settings.

Actual operating conditions 306 of the vehicle system 100 also are shown in FIG. 3. The designated operational settings 300 and the actual operating conditions 306 may represent similar operations of the vehicle system 100. For example, the designated operational settings 300 can represent designated speeds of a trip plan while the actual operating conditions 306 represent actual speeds of the vehicle system 100. As another example, the designated operational settings 300 can represent designated accelerations of a trip plan while the actual operating conditions 306 represent actual accelerations of the vehicle system 100. As another example, the designated operational settings 300 can represent designated throttle positions, brake settings, or the like, of a trip plan while the actual operating conditions 306 represent corresponding actual throttle positions, brake settings, or the like, of the vehicle system 100.

During a first time period or distance range 308 of the trip plan, the actual operating conditions 306 of the vehicle system 100 are the same as or approximately the same as the designated operational settings 300 of the trip plan. For example, the actual operating conditions 306 may be within a designated threshold range (e.g., 1%, 5%, 10%, or another value) of the designated operational settings 300 of the trip plan. Subsequent to the first time period or distance range 308, the actual operating conditions 306 begin to deviate from the designated operational settings 300 of the trip plan by increasing amounts during a second time period or distance range 310.

The actual operational conditions 306 may be compared to the designated operational settings 300 in order to identify differences there between. For example, during the time period or distance range 308, these differences may be relatively small. During the subsequent time period or distance range 310, however, the differences increase and may become relatively large.

Returning to the description of the method 200 shown in FIG. 2, at 210, a determination is made as to whether to revise the trip plan. If the differences between the actual operating conditions 306 of the vehicle system 100 and the designated operational settings 300 of the trip plan become sufficiently large, then these differences may indicate that the vehicle system 100 is unable to follow the trip plan and/or that the trip plan needs to be revised to account for the differences.

If the differences between the actual operating conditions 306 and the designated operational settings 300 are relatively small (e.g., no larger than a designated, non-zero threshold amount or range), then flow of the method 200 may return to 204. For example, the vehicle system 100 may continue traveling along the route 102 according to the trip plan while monitoring the actual operating conditions 306 of the vehicle system 100.

On the other hand, if the differences between the actual operating conditions 306 and the designated operational settings 300 are relatively large (e.g., at least as large as the designated, non-zero threshold amount or range), then flow of the method 200 may proceed to 212.

At 212, the trip plan is modified. The trip plan may be modified by changing the designated operational settings of the trip plan and/or by creating a new trip plan for at least a portion or all of a remainder of the trip of the vehicle system 100.

Designated operational settings 312 of a revised trip plan also are shown in FIG. 3. The designated operational settings 312 (also referred to as revised designated operational settings 312) differ from the operational settings 300 previously designated by the trip plan. As shown in FIG. 3, the revised designated operational settings 312 may differ from the designated operational settings 300 of the previous trip plan throughout all or at least a portion of the remainder of the trip plan. Alternatively, the revised designated operational settings 312 eventually may match up to the designated operational settings 300 of the previous trip plan at a later time.

In one embodiment, the revised trip plan begins with designated operational settings 312 that are the same as the actual operating conditions 306 of the vehicle system 100. The revised trip plan may be implemented at an implementation time or an implementation location 314 during the trip. The first or initial operational setting that is designated by the revised trip plan at or soon after the implementation time or location 314 may match the operational condition 306 of the vehicle system 100 at or just prior to the implementation time or location 314. For example, the revised trip plan may begin with a designated operational setting 312 at the implementation time or location 314 that is the same as the actual operating condition 306 of the vehicle system 100.

The designated operational setting 312 that begins the revised trip plan may be the same as or match the actual operating condition 306 of the vehicle system 100 when the designated operational setting 312 is equivalent to the actual operating condition 306 of the vehicle system 100 or within a designated range of the actual operating condition 306 (e.g., 0.1%, 1%, 5%, 10%, or another value). Because the actual operating conditions 306 of the vehicle system 100 may be changing with respect to time or distance traveled during the trip as the trip plan is being revised, one or more actual operating conditions 306 may be selected as the initial designated operational setting 312. For example, in one embodiment, the actual operating condition 306 at the implementation time or location 314 may be used as the initial designated operational setting 312 of the revised trip plan. Alternatively, the initial designated operational setting 312 of the revised trip plan may be selected from several prior actual operating conditions 306. Due to computer processing requirements for generating the revised trip plan, the actual operating condition 306 of the vehicle system 100 at the implementation time or location 314 may not be able to instantaneously become the first designated operational setting 312 of the revised trip plan.

Instead, one or more of the actual operating conditions 306 of the vehicle system 100 prior to the implementation time or location 314 may be used as the first designated operational setting 312 of the revised trip plan. For example, the actual operating condition 306 that exists or is determined when the revised trip plan is created may be used as the first designated operational setting 312 of the revised trip plan. As another example, an average, median, moving average, or the like, of the actual operating conditions 306 prior to the implementation time or location 314 may be used as the first designated operational setting 312 of the revised trip plan. One or more of the actual operating conditions 306 occurring between a deviation time or location 316 where the actual operating conditions 306 began differing from the designated operational settings 300 of the previous trip plan by more than the designated threshold or range and the implementation time or location 314 may be used as the initial designated operational setting 312 of the revised trip plan.

Revising trip plans using some known systems or methods can involve generating transitional designated operational settings 318 that act as a bridge between the actual operating conditions 306 and the operational settings 300 designated by the previous trip plan. These transitional operational settings 318 cause the vehicle system 100 to return to the operational settings 300 designated by the previous trip plan. In contrast, the operational settings 312 of the revised trip plan may not match or be equivalent to the previous trip plan such that the previous trip plan and the revised trip plan differ for all or at least a portion of the remainder of the trip. The transitional operational settings 318 may return the vehicle system 100 to operating according to the previous trip plan, but implementing these operational settings 318 can cause the vehicle system 100 to consume more fuel and/or generate more emissions than if the vehicle system 100 were to travel according to the operational settings 312 of the revised trip plan. For example, the vehicle system 100 may consume less fuel and/or generate fewer emissions traveling according to the operational settings 300 of the initial trip plan than by traveling according to the operational settings 312 of the revised trip plan. But, traveling according to the operational settings 312 of the revised trip plan can result in the vehicle system 100 consuming less fuel and/or generating fewer emissions than traveling according to the transitional operational settings 318 and the operational settings 300 of the initial trip plan following the transitional operational settings 318.

Flow of the method 200 shown in FIG. 2 may return to 204 from 212. For example, the vehicle system 100 may continue to travel along the route 102 according to the operational settings 312 of the revised trip plan. The method 200 may continue in a loop-wise manner to repeatedly determine whether to modify a trip plan or revised trip plan, revise the trip plan, and continue traveling until the vehicle system 100 reaches a destination or implementation of the trip plan is otherwise stopped.

Figure 4:
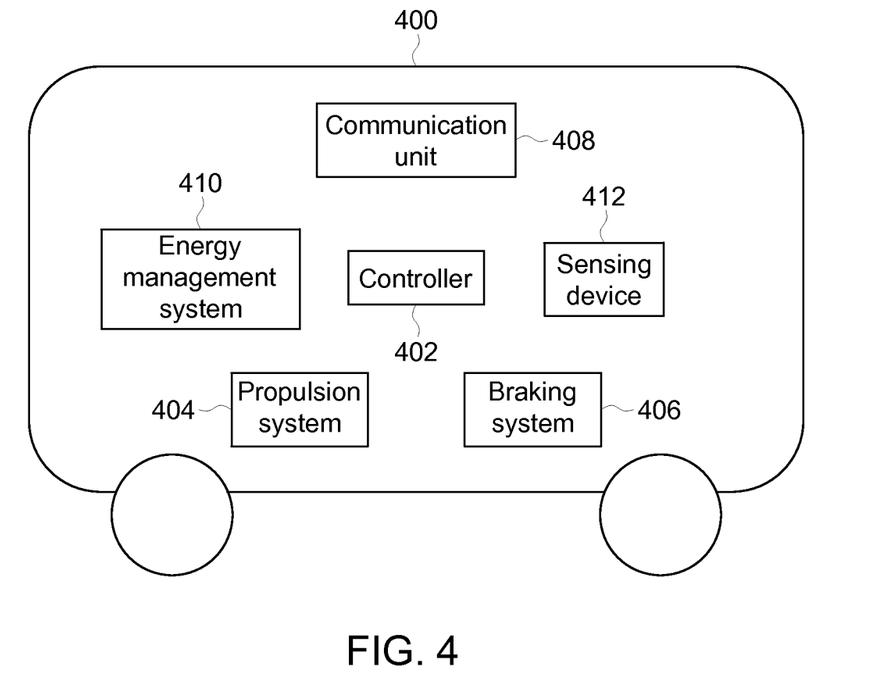
FIG. 4 is a schematic illustration of a vehicle according to one embodiment.

FIG. 4 is a schematic illustration of a vehicle 400 according to one embodiment. The vehicle 400 may represent one or more of the vehicles 108, 110 shown in FIG. 1. For example, the components shown in FIG. 4 as being onboard the vehicle 400 may be disposed onboard two or more different vehicles 108, 110 of the vehicle system 100 shown in FIG. 1.

A controller 402 of the vehicle 400 includes or represents hardware circuits or circuitry that include and/or are connected with one or more computer processors, such as one or more computer microprocessors. The controller 402 can control operations of the vehicle 400 and/or vehicle system 100, such as by autonomously controlling a propulsion system 404 and/or a braking system 406 of the vehicle 400 according to a trip plan or revised trip plan, and/or by receiving input from an operator to manually control the propulsion system 404 and/or the braking system 406 according to the trip plan or revised trip plan. For example, the controller 402 may represent or include one or more input devices, such as a throttle, pedal, touchscreen, electronic mouse, stylus, microphone, or the like, to receive commands from an operator to control operations of the vehicle 400.

The propulsion system 404 represents one or more components that work to generate tractive effort or power. For example, the propulsion system 400 can represent one or more motors, engines, or the like, that propel the vehicle 400. The braking system 406 represents one or more components that work to slow or stop movement of the vehicle 400, such as airbrakes, friction brakes, or the like.

A communication unit 408 of the vehicle 400 represents hardware circuits or circuitry that include and/or are connected with one or more computer processors (e.g., microprocessors) and communication devices (e.g., wireless antenna and/or wired connections) that operate as transmitters and/or transceivers for communicating signals with one or more locations disposed off-board the vehicle 400. For example, the communication unit 408 may wirelessly communicate signals with a facility and/or another vehicle system, or the like. The communication unit 408 may receive trip plans or revised trip plans from off-board locations and/or may communicate trip plans or revised trip plans to off-board locations.

An energy management system 410 of the vehicle 400 includes or represents hardware circuits or circuitry that include and/or are connected with one or more computer processors, such as one or more computer microprocessors. The energy management system 410 creates and/or revises the operational settings designated by trip plans to form and/or revise the trip plans. One example of an energy management system 410 includes the Trip Optimizer™ system of the General Electric Company, but alternatively may be another type of energy management system.

The energy management system 410 can create and/or revise a trip plan based on trip planning data, such as trip data, vehicle data, and/or route data. Trip data includes information about an upcoming trip by the vehicle 400 or vehicle system 100. By way of example only, trip data may include station information (such as the location of a beginning station where the upcoming trip is to begin and/or the location of an ending station where the upcoming trip is to end), restriction information (such as work zone identifications, or information on locations where the track is being repaired or is near another track being repaired and corresponding speed/throttle limitations on the rail vehicle), and/or operating mode information (such as speed/throttle limitations on the vehicle system in various locations, slow orders, and the like). Vehicle data includes information about the vehicle 400, vehicle system 100, and/or cargo being carried by the vehicle 400 and/or vehicle system 100. For example, vehicle data may represent cargo content (such as information representative of cargo being transported by the vehicle) and/or vehicle information (such as model numbers, manufacturers, horsepower, and the like, of the vehicle). Route data includes information about the route upon which the vehicle or vehicle system travels. For example, the route data may include information about locations of damaged sections of a route, locations of route sections that are under repair or construction, the curvature and/or grade of a route, and the like. The route data is related to operations of the vehicle as the route data includes information about the route that the vehicle is or will be traveling on. However, other types of data can be recorded as the data and/or the data may be used for other operations. The trip plans optionally may be referred to as trip profiles or speed profiles, and can be formed in accordance with one or more embodiments described in U.S. patent application Ser. No. 13/545,271, the entire disclosure of which is incorporated herein by reference.

A sensing device 412 of the vehicle 400 represents one or more components that determine (e.g., measure, sense, calculate, estimate, model, or otherwise obtain) the operating conditions of the vehicle 400 and/or vehicle system 100 that includes the vehicle 400. For example, the sensing device 412 can include one or more sensors, such as tachometers, accelerometers, coupler force sensors, global positioning system receivers, air pressure sensors, sensors that detect throttle positions, or the like. These sensors can measure operating conditions of the vehicle system 100 and generate data representative of the operating conditions. Optionally, the sensing device 412 can include hardware circuits or circuitry that include and/or are connected with one or more computer processors (e.g., microprocessors) that are configured to determine the actual operating conditions of the vehicle 400 and/or vehicle system 100 based on a mathematical or physics-based model of the vehicle 400 and/or vehicle system 100. For example, based on relative speeds, locations, and/or accelerations of different vehicles in the vehicle system 100, a spring model, lumped mass model, or other type of model may be used to calculate or estimate the operating conditions of the vehicle system 100 (e.g., coupler forces, slack in the couplers, or the like). As another example, based on measured air pressures in the brake system of the vehicle 400 or another brake system of the vehicle system 100, a hydraulic model of the brake system(s) can be used to calculate or estimate air pressures and/or air flows in one or more locations of the brake system(s) as the operating conditions of the vehicle 400 or vehicle system 100.

This data can be communicated from the sensing device 412 to the controller 402 and/or energy management system 410. The controller 402 can use this data as feedback to determine how to control the vehicle 400 and/or vehicle system 100 in order to follow the trip plan. The energy management system 410 can use this data to determine when to revise the trip plan and/or to determine the initial operational settings designated by the revised trip plan, as described herein.

In one embodiment, a method (e.g., for revising a trip plan of a vehicle system) includes operating a vehicle system according to a current trip plan as the vehicle system travels along a route during a trip. The current trip plan designates operational settings of the vehicle system. During movement of the vehicle system along the route, a current, actual operation of the vehicle system differs from the current trip plan by at least a designated threshold amount. The method also can include revising the current trip plan into a revised trip plan responsive to the current, actual operation of the vehicle system differing from the current trip plan by at least the designated threshold amount. The revised trip plan designates operational settings of the vehicle system and includes an initial designated operational setting that matches the current, actual operation of the vehicle system.

In one aspect, revising the current trip plan occurs during movement of the vehicle system along the route during the trip.

In one aspect, the initial designated operational setting of the revised trip plan matches a current, actual operational setting of the vehicle system.

In one aspect, the current, actual operation of the vehicle system differs from the current trip plan during a time period that the initial designated operational setting of the revised trip plan is scheduled to be implemented by the vehicle system.

In one aspect, the current trip plan and the revised trip plan designate the operational settings of the vehicle system as a function of one or more of time or distance along the route.

In one aspect, the method also can include determining the current, actual operation of the vehicle system using one or more sensing devices.

In one aspect, the method also can include determining the current, actual operation of the vehicle system based on one or more models of the vehicle system.

In one aspect, the current trip plan is revised such that the operational settings designated by the revised trip plan differ from the operational settings designated by the current trip plan over an upcoming segment of the trip.

In one aspect, the operational settings designated by the current trip plan, the operational settings of the revised trip plan, and the current, actual operation of the vehicle system include one or more of a speed, a throttle position, a brake setting, or an acceleration of the vehicle system.

In one aspect, the method also includes operating the vehicle system according to the operational settings designated by the revised trip plan. Operating the vehicle system according to the revised trip plan can cause the vehicle system to one or more of consume more fuel and/or generate increased emissions relative to the vehicle system operating according to the operational settings designated by the current trip plan. But, operating the vehicle system according to the revised trip plan also can cause the vehicle system to one or more of consume less fuel and/or generate fewer emissions relative to the vehicle system returning to operating according to the operational settings designated by the current trip plan.

In another embodiment, a system (e.g., an energy management system) includes or more processors configured to at least one of direct an operator to control or autonomously control a vehicle system according to a current trip plan as the vehicle system travels along a route during a trip. The current trip plan designates operational settings of the vehicle system. During movement of the vehicle system along the route, a current, actual operation of the vehicle system differs from the current trip plan by at least a designated threshold amount. The one or more processors also are configured to revise the current trip plan into a revised trip plan responsive to the current, actual operation of the vehicle system differing from the current trip plan by at least the designated threshold amount. The revised trip plan designates operational settings of the vehicle system that include an initial designated operational setting that matches the current, actual operation of the vehicle system.

In one aspect, the one or more processors are configured to revise the current trip plan during movement of the vehicle system along the route during the trip.

In one aspect, the one or more processors are configured to revise the current trip plan into the revised trip plan such that the initial designated operational setting of the revised trip plan matches a current, actual operational setting of the vehicle system.

In one aspect, the current, actual operation of the vehicle system differs from the current trip plan during a time period that the initial designated operational setting of the revised trip plan is scheduled to be implemented by the vehicle system.

In one aspect, the current trip plan and the revised trip plan designate the operational settings of the vehicle system as a function of one or more of time or distance along the route.

In one aspect, the one or more processors are configured to revise the current trip plan such that the operational settings designated by the revised trip plan differ from the operational settings designated by the current trip plan over an upcoming segment of the trip.

In one aspect, the operational settings designated by the current trip plan, the operational settings designated by the revised trip plan, and the current, actual operation of the vehicle system include one or more of a speed, a throttle position, a brake setting, or an acceleration of the vehicle system.

In another embodiment, a method (e.g., for revising a trip plan) includes operating a vehicle system according to a first trip plan that designates operational settings of the vehicle system as a function of one or more of time or distance along a route, determining an actual operational setting of the vehicle system, and, based at least in part on the actual operating setting, changing the operational settings designated by the first trip plan into revised operational settings of a revised trip plan. The revised trip plan includes a first operational setting of the revised operational settings that matches a current operational setting of the vehicle system during a time period that the revised trip plan is implemented in place of the first trip plan. The method also can include operating the vehicle system according to the operational settings designated by the revised trip plan.

In one aspect, the operational settings designated by the first trip plan and designated by the revised trip plan include a speed of the vehicle system.

In one aspect, operating the vehicle system according to the operational settings designated by the revised trip plan causes the vehicle system to one or more of consume more fuel or generate increased emissions relative to the vehicle system operating according to the operational settings designated by the first trip plan, but also cause the vehicle system to one or more of consume less fuel or generate fewer emissions relative to the vehicle system returning to operating according to the operational settings designated by the first trip plan.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A method comprising:
at least one of directing an operator to control or autonomously controlling a vehicle system according to a current trip plan as the vehicle system travels along a route during a trip, the current trip plan designating operational settings of the vehicle system, wherein the operational settings that are designated by the current trip plan include one or more throttle settings, brake settings, accelerations, or speeds of the vehicle system as a function of one or more of time or distance along the route;

determining a current, actual operation of the vehicle system using one or more sensing devices, wherein, during movement of the vehicle system along the route, the current, actual operation of the vehicle system differs from the current trip plan by at least a designated threshold amount; and revising the current trip plan into a revised trip plan responsive to the current, actual operation of the vehicle system differing from the current trip plan by at least the designated threshold amount, wherein the revised trip plan designates operational settings of the vehicle system, the operational settings designated by the revised trip plan including an initial designated operational setting that matches the current, actual operation of the vehicle system.

2. The method of claim 1, wherein revising the current trip plan occurs during movement of the vehicle system along the route during the trip.

3. The method of claim 1, wherein the initial designated operational setting of the revised trip plan matches a current, actual operational setting of the vehicle system.

4. The method of claim 1, wherein the current, actual operation of the vehicle system differs from the current trip plan during a time period that the initial designated operational setting of the revised trip plan is scheduled to be implemented by the vehicle system.

5. The method of claim 1, further comprising determining the current,
actual operation of the vehicle system based on one or more models of the vehicle system.

6. The method of claim 1, wherein the current trip plan is revised such that the operational settings designated by the revised trip plan differ from the operational settings designated by the current trip plan over an upcoming segment of the trip.

7. The method of claim 1, further comprising operating the vehicle system according to the operational settings designated by the revised trip plan,
wherein operating the vehicle system according to the revised trip plan causes the vehicle system to one or more of consume more fuel or generate increased emissions relative to the vehicle system operating according to the operational settings designated by the current trip plan, but also causes the vehicle system to one or more of consume less fuel or generate fewer emissions relative to the vehicle system returning to operating according to the operational settings designated by the current trip plan.

8. A system comprising:
one or more processors configured to at least one of direct an operator to control or autonomously control a vehicle system according to a current trip plan as the vehicle system travels along a route during a trip, the current trip plan designating operational settings of the vehicle system, wherein the operational settings designated by the current trip plan include one or more throttle settings, brake settings, accelerations, or speeds of the vehicle system as a function of one or more of time or distance along the route; and
one or more sensing devices configured to determine a current, actual operation of the vehicle system, wherein, during movement of the vehicle system along the route, the current, actual operation of the vehicle system differs from the current trip plan by at least a designated threshold amount, and wherein the one or more processors also are configured to revise the current trip plan into a revised trip plan responsive to the current, actual operation of the vehicle system differing from the current trip plan by at least the designated threshold amount, the revised trip plan designating operational settings of the vehicle system, the operational settings of the revised trip plan including an initial designated operational setting that matches the current, actual operation of the vehicle system.

9. The system of claim 8, wherein the one or more processors are configured to revise the current trip plan during movement of the vehicle system along the route during the trip.

10. The system of claim 8, wherein the one or more processors are configured to revise the current trip plan into the revised trip plan such that the initial designated operational setting of the revised trip plan matches a current, actual operational setting of the vehicle system.

11. The system of claim 8, wherein the current, actual operation of the vehicle system differs from the current trip plan during a time period that the initial designated operational setting of the revised trip plan is scheduled to be implemented by the vehicle system.

12. The system of claim 8, wherein the one or more processors are configured to revise the current trip plan such that the operational settings designated by the revised trip plan differ from the operational settings designated by the current trip plan over an upcoming segment of the trip.

13. A method comprising:
at least one of directing an operator to control or autonomously controlling a vehicle system according to a first trip plan that designates operational settings of the vehicle system as a function of one or more of time or distance along a route, the operational settings including one or more throttle settings, brake settings, accelerations, or speeds of the vehicle system;

determining an actual operational setting of the vehicle system using one or more sensing devices;

based at least in part on the actual operating setting, changing the operational settings designated by the first trip plan into revised operational settings of a revised trip plan, wherein the revised trip plan includes a first operational setting of the revised operational settings that matches a current operational setting of the vehicle system during a time period that the revised trip plan is implemented in place of the first trip plan; and operating the vehicle system according to the operational settings designated by the revised trip plan.

14. The method of claim 13, wherein the operational settings designated by the first trip plan and designated by the revised trip plan include the speeds of the vehicle system.

15. The method of claim 13, wherein operating the vehicle system according to the operational settings designated by the revised trip plan causes the vehicle system to one or more of consume more fuel or generate increased emissions relative to the vehicle system operating according to the operational settings designated by the first trip plan, but also cause the vehicle system to one or more of consume less fuel or generate fewer emissions relative to the vehicle system returning to operating according to the operational settings designated by the first trip plan.

* * * * *